United States Patent [19]

Papenmeier, deceased

[11] 3,854,702

[45] *Dec. 17, 1974

[54] METHOD AND DEVICE FOR THE CONTINUOUS PRODUCTION OF SYNTHETIC RESIN MASSES

[76] Inventor: Günther Papenmeier, deceased, late of Schulstrasse, Pivitsheide vl Kr. Detmold, Germany, Luise Papenmeier, nee Mellies, widow

[ * ] Notice: The portion of the term of this patent subsequent to June 17, 1989, has been disclaimed.

[22] Filed: Apr. 28, 1969

[21] Appl. No.: 819,709

[30] Foreign Application Priority Data
Apr. 29, 1968 Germany............................ 1778436

[52] U.S. Cl....................... 259/8, 259/67, 260/96 R
[51] Int. Cl. ............................. B01f 3/08, B01f 7/20
[58] Field of Search .............. 259/8, 23, 24, 43, 44, 259/66, 67, 185; 260/95 R, 95 A, 95 C, 96 R

[56] References Cited
UNITED STATES PATENTS 2,850,467  9/1958  Livingood.............................. 259/66
3,308,096  3/1967  Ivanov et al. ...................... 260/95 R

FOREIGN PATENTS OR APPLICATIONS 1,188,264  12/1960  Germany ................................ 259/8
  225,823  11/1960  Austria .................................. 259/66
  191,169   1/1964  Sweden.................................. 259/8

Primary Examiner—Harvey C. Hornsby
Assistant Examiner—Alan Cantor
Attorney, Agent, or Firm—Irving M. Weiner

[57] ABSTRACT

A method and device for the continuous production of synthetic masses wherein the resin mass and the adjuvants or powder mixtures are fed centrally into a mixing container, and the raw materials are heated by the intensive friction and the shearing forces produced by a mixing tool rotating on the bottom of the container. The thus heated lighter synthetic particles are displaced upwardly across the constantly centrally fed cold heavier synthetic particles on the smooth container wall, and are conducted away from the upper portion of the mixing container at a given temperature.

6 Claims, 3 Drawing Figures

METHOD AND DEVICE FOR THE CONTINUOUS PRODUCTION OF SYNTHETIC RESIN MASSES

The invention relates to a continuous mixing and producing method in which, in a plurality of consecutive high-speed mixers, synthetic resins with adjuvants such as softeners, stabilisers, lubricants, colourants, fillers and the like are mixed, if necessary, dried, pregelated, degassed and fed in a hot state to a processing machine, for example, a worm press.

The production of synthetic resins is known to be carried out predominantly in high-speed mixers, in which by charges, mixing of the adjuvants and the thermal preparation are performed either by jacket heating and frictional heat or by frictional heat alone.

The thermal treatment of the synthetic resin requires, especially in high-speed mixers, an accurate regulation of the speed of rotation of the mixing tool in order to control, for example, the temperatures of feeding as well as the times and the final temperatures for a given degree of gelation of the synthetic resin.

The processing machines for production in charges require a complicated control-device for switching on and off the agitator motors and for frequent changeover to different speed values for regulating the rotational speed of the mixing tool, the heating of the container, and the control of the time of a charge. By these machines and the associated arrangement, for example, synthetic resins are mixed and heated a short time prior to the gelation temperature to form agglomerates. The agglomerate is cooled in a subsequent coolant container in order to avoid baking together of the agglomerates. Thus a loose product is obtained for being further processed in worm presses or by rollers. The technical complications and the required power due to the constant energy fluctuations are considerable and involve a high degree of adverse economy.

It has therefore been proposed to use mixing and producing machines of this kind in continuous operation, but these proposals failed particularly due to the lack of a check of uniform mixing and of the temperature stages required by the method during the thermal process, which check can be carried out only with difficulty in a container.

A known whirl-like agitation by a mixing apparatus is not suitable for a continuous thermal production of the synthetic resins from room temperature up to the full gelation due to the constantly varying consistency, the casting density, and the degree of gelation depending upon the respective heat of the synthetic resin.

A rigid mixing tool can be formed structurally only for a defined operation and a defined consistency of the raw material. Therefore, the preparation in charges appeared to be unavoidable in order to adapt by control of the speed of rotation of the mixing tool, the friction and the agitation to the given separate temperature and consistency conditions so that a substantially uniform pre-gelation could be obtained. The degree of thermal preparation, however, remains stable only within very narrow limits with respect to complete plastification of the synthetic substances in extruders following the mixing operation. At very high operational temperatures in the mixer, there occurs not only an undesired non-uniform agglomeration, but also a partial plastification of the synthetic mass within a very short period of time. This mass can then no longer be divided for further processing in the extruders.

With all these suggested arrangements the temperature required for the plastification is uneconomically lost in the subsequent processing machine, for example, in a worm press, in the preceding cooling mixer, which temperature has been reached in the preceding preparation process in the heating mixer. The agglomerate made in known manner in the high-speed mixer, as compared with the completely plastified granulate, exhibits still important drawbacks with respect to adequate plastification, which have to be attributed to the disadvanges described above for mixing machines and to the different flow ratios in a large mixing container. During the further processing in the worm press up to the delivery of the product it is difficult, by pressure and external heating of the cylinder sheath, to cause the non-gelated particles in the agglomerate to plasticize completely and perfectly.

The imperfection of the degree of gelation in an agglomerate produced in known manner or in a powder mixture is proved by various examinations of strands of material under way of formation in the worm press. The masses under way of processing not directly adjacent the surfaces of the worm blades, the worm core or the cylinder, contain many unplasticized particles, which could not be dissolved before the delivery from the nozzle.

In spite of the development of many worm shapes and kinds of worms for an improved distribution of the raw material in the strand of material, a fully perfect plastification, particularly in mixtures poor in softeners or free of softeners cannot yet be obtained with satisfying results. The criterion increases with the section of the worm and the cross sectional area of the strand of material in the worm path.

A worm press has the disadvantage that the mass of material is exposed from the inlet zone to the exit nozzle to a strongly increasing temperature, whilst released vapours due to the rapid rise of temperature counteract the flow of material, which has an adverse effect on the filling of the worm paths in the inlet zone. This phenomenon renders ineffective the required compression in the worm compartments and only in the ultimate or penultimate compartments an actual densification and a terminal plastification are achieved. The particles contained in the strand of material can no longer be completely gelated.

The invention has for its object to provide an improved plastification in the production process or in the preliminary process for working up the material to the ready product in a manner such that in a continuous mixing operation a better plasticized product may be obtained which is driven without intermediate cooling to an extent such that, for example, a subsequent worm press can operate at a lower temperature and with smaller temperature variation than hitherto so that the temperature gradient hitherto required from the worm surfaces to the centre of the cross section of the strand of material is dispensed with because the synthetic mass is already completely heated and the worm only has to perform the liquefaction of the synthetic resin under pressure.

According to the invention loss of temperature required in the preparation process of the synthetic mass down to slightly below the gelation point is avoided, whilst the temperature value once attained in the material is maintained and the synthetic mass thus heated can be immediately worked up to the ready product.

It is required in such an arrangement to ensure a constant flow of material of the synthetic mass with an accurately checked temperature and to transfer it at a given instant shortly before the complete degree of gelation within a short time to a processing machine, for example, a worm press.

The practical performance of such a method is based on the recognition of the fact that during the mixing and preparation process for the production of hard to soft synthetic resin mixtures the cast weight decreases constantly with the constant rise of temperature, which is due to a progressive swelling of the synthetic resin particles, so that the consistency and the behaviour of the material during agitation vary constantly. The cast weight of a hot synthetic mass is inversely proportional To the mass cooled to room temperature.

Example:
Received mass: 5.00 kgs of Vestolit S 6857
0.10 kgs of Pb Ca 3617

| Temperature (°C.) | Cast or Bulk Weight (g/ml) |
|---|---|
| 20 | 0.66 |
| 60 | 0.66 |
| 80 | 0.63 |
| 90 | 0.60 |
| 100 | 0.54 |
| 110 | 0.52 |
| 120 | 0.49 |
| 130 | 0.49 |
| 140 | 0.49 |

Zone measurement in the container:

| | |
|---|---|
| Zone IV | = 136° C |
| Zone III | = 133° C |
| Zone II | = 130° C |
| Zone I | = 114° C. |

From this example it will be obvious that at a rise of temperature of 140° C the cast weight dropped to 0.49 g/ml. After cooling of this mass to 40° C the cast weight increased to 0.63 g/ml, after further cooling to room temperature (20° C) a cast weight of 0.65 g/ml was assessed. Further experiments yielded similar results. It has furthermore been assessed that the variation of the litre-weight depends upon the received mass and the types of synthetic resins concerned. The use of E-PVC types shows a greater weight reduction than the S-PVC types. This assessment leads to the technical law in accordance with the present invention that a continuous thermal preparation of synthetic substances can be performed in a container without mechanical expedients other than a mixing tool, while the incoming colder synthetic mass is led in a controllable manner separately from the lighter hotter synthetic mass, and the thermally prepared synthetic particles are conducted away automatically in accordance with the degree of heating and gelation.

The continuous penetration through a mixing container can provide, however, only part of the overall thermal preparation process, because with the rise in temperature the consistency and the behavior in the agitation also vary and the further treatment has then to be carried out by matching mixing tools, with corresponding agitation speeds, shear forces and, if necessary, in a different, required temperature range.

It is therefore necessary to control the whole temperature range - from the room temperature of the synthetic resin to the temperature of complete gelation - for the overall thermal preparation, to guide the synthetic mixture through a plurality of coupled mixing units, whilst in each mixing container mixing tools matching the respective consistency have to be present, the speeds of rotation, the temperatures, and the times have to be adjustable.

The method in accordance with the invention and the device for carrying out the method of a continuous production of synthetic masses in subsequent processing machines will now be described more fully with reference to the accompanying drawings by way of example.

BRIEF DESCRIPTION OF THE DRAWINGS

FIG. 1 shows schematically the performance of the method in accordance with the invention, in which the colder synthetic masses enter centrally the container 1 and are fed directly to the mixing tool 2, adapted to rotate on the container bottom.

Figure 1:
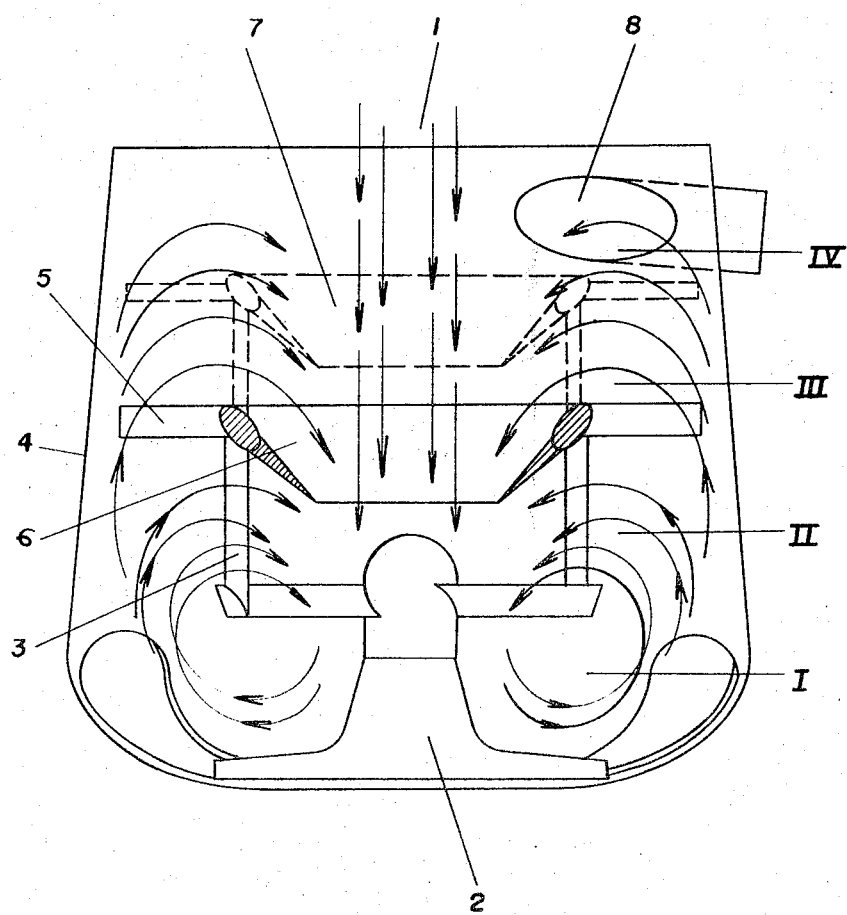
FIG. 1 shows a schematic illustration of the flow conditions and temperature stages in the continuous mixing process.

In the zone I the synthetic resin particles are rapidly heated by intensive friction and shear effects. In the colder state the synthetic mass is still loose and owing to its higher weight it easily follows the force of gravity. Therefore, this mass is supported by the vertical, set tool profiles 3 and fed back toroidally to the mixing tool 2. Consequently, a colder synthetic mass stays in the range of the zones I and II, where the highest friction and shear forces of the mixing tool 2 are operative.

With the increasing temperature and the modified agitation behaviour the synthetic resin particles assume a lesser density owing to the continuing swelling and are slower and are displaced upwardly into the zone II along the container wall 4 owing to the continuously supplied colder and heavier synthetic resin mixture. In this zone II the heated synthetic resin mixture is accelerated and subjected to friction with the upper profiles 5 of the mixing tool. Heavier particles, which have not yet completely performed the swelling process can get with the incoming flow 1 of the cold synthetic mass via the funnelshaped form 6 of the mixing tool again into the zones I and II, where they are again subjected to the intensive frictional forces.

In accordance with the raw materials and temperature ranges concerned a further tool 7 may be arranged above the mixing tool 6 in order to provide the same effect of the mixing tool parts 5 and 6 in the zone IV.

The continuous mixing principle in accordance with the invention provides a rapid and uniform heating of the synthetic mass hitherto unknown, which has in the first place to be attributed to the fact that the hotter, lighter layers of material cover from above from zone to zone the colder layers and do not allow cooling air to penetrate to the heating synthetic mass.

This phenomenon is disadvantageous, for example, in the charge-like preparation in a mixing container, since such a mixing container permits only a partial filling thereof in order to reserve adequate space for the swelling effect of the heating process.

Moreover, in the boundary layers of the zones cold and hot particles are mixed up so that the temperature equilibrium is advantageously effected. The colder mixing particles with the harder surfaces and the hotter particles with the softer surfaces enhance, in addition, the favourable frictional effect of the particles with each other.

When the mixture in such a mixing container has reached the zone 4 under given temperature conditions, the heated the synthetic mass is fed by a device 8 to a subsequent container. In this container the aforesaid preparing process is repeated, however, at temperatures matching the then prevailing material conditions, shear forces, speeds of rotation as required for the substances to be prepared. In any of the containers there may be provided dosing members for adjuvants, air supply members and drying members supplying hot air, cold air, etc.

According to the method of the invention it is possible to to adjust any number of intercoupled mixing containers to all mixing and preparing processes of any kind and separately to the relevant conditions of substances and recipes and to obtain a uniform heating, degassing and an optimum state of gelation in the synthetic mixture.

Figure 2:
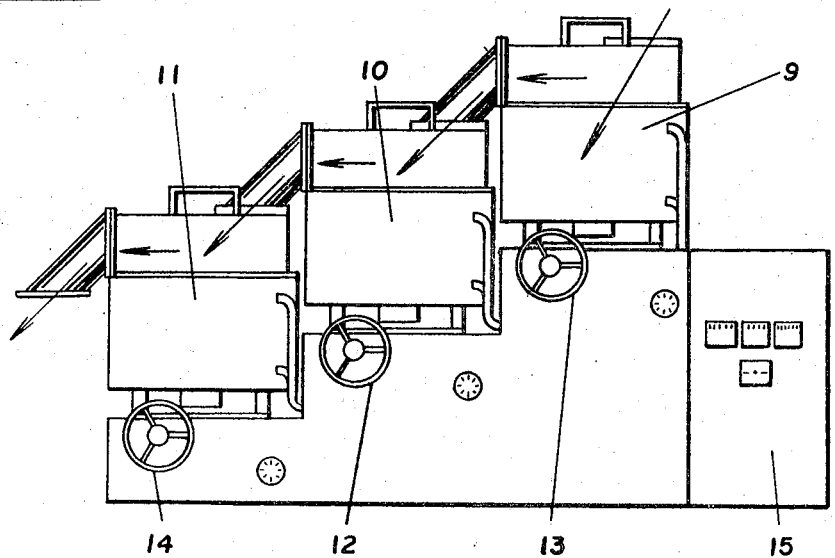
FIG. 2 illustrates an example of an arrangement of three consecutive continuous mixing containers forming a mixing and preparing system.

FIG. 2 shows by way of example such an arrangement comprising three mixing containers, in which each mixing unit 9, 10, 11 is equipped with control-members 12, 13, 14 respectively for adjusting the speed of rotation of the mixing tool concerned. Each mixing container is provided with separately controllable heating. The overall arrangement can be actuated and controlled via a central control 15.

Figure 3:
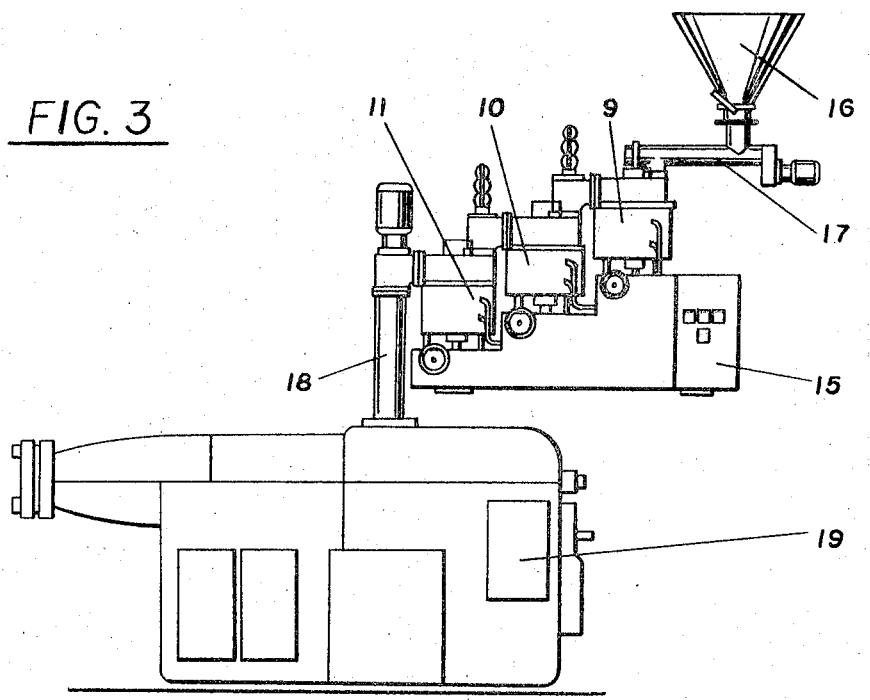
FIG. 3 depicts a device like FIG. 2 as a preliminary aggregate for a worm press for the thermal preparation of ready powder mixtures.

FIG. 3 shows a device for carrying out the method in accordance with the invention in the form of a preliminary device connected with a worm press. If, in accordance with the local conditions, mixing of the adjuvants and thermal preparation are carried out in a conventional way by a heating and cooling mixer, for example, for producing a Dryblend, a Premix and the like, the method according to the invention may also be used advantageously.

Powder mixtures are fed, as described above, from a stock container 16 through a continuously controllable dosing member 17 into the mixing units 9, 10, 11, operating in accordance with the method of the invention, the powder mixture being thus uniformly heated, dried, degassed and fed in the hot state, for example, by by a packing worm 18 into the inlet zone of a worm press 19.

The known, dangerous high temperature gradient is not produced in the worm press, since the synthetic material is fed with high temperatures into the inlet zone of the worm. Consequently, in the inlet zone the synthetic mass is first cooled so that compulsorily a given subatmospheric pressure is produced. This resulting subatmospheric pressure is very important for a satisfying filling of the worm compartments, because air and vapour occlusions in the mass itself are thus eliminated to a great extent. In addition the hot synthetic mass is in intimate contact with the active surfaces of the worm press. The synthetic mass located in the interior of the worm compartments already has a higher temperature than the adjacent surfaces of the worm press. By the method according to the invention approximately inverse temperature conditions are obtained in the worm press, which counteract the poor thermal conductivity of the synthetic resin, whilst occlusions of non-plasticized particles are avoided.

A simple worm is sufficient to deliver the synthetic mass completely tempered by this method by few windings and at low operational temperature in a perfect, completely plasticized state. Non-completely gelated particles and flow strips in the final product are excluded, because temperature differences in the mass no longer occur in front of and after the worm compartments.

The method in accordance with the invention for mixing and preparing synthetic resins permits an overall preparation and processing of synthetic resins with any known adjuvants in a single continuous operation by simple technical means and by a considerably reduced energy supply, whilst an improved final product is obtained.

I claim:

1. A method of continuously mixing and preparing synthetic resins comprising the steps of:

centrally feeding into a mixing container at least one synthetic resin and at least one adjuvant into a first zone of said container;

heating said synthetic resin and said adjuvant by intensive frictional and shearing forces produced by a mixing tool rotating on the bottom of said mixing container in said first zone;

displacing at an increased temperature the mixed and heated lighter synthetic particles upwardly in and on the smooth walls of the container;

feeding said heated particles to a second zone in the container immediately above said first zone;

admixing said heated particles with the continuously centrally fed cold heavier particles;

further heating said heated particles in admixture in said first zone;

feeding said further heated particles to a third zone in said container, said third zone being immediately above said second zone;

admixing said further heated particles with said heated particles of said second zone and said continuously centrally fed cold heavier particles;

additionally heating said further heated particles in admixture in said first zone;

feeding said additionally heated particles to a fourth zone in said container, said fourth zone being immediately above said third zone;

admixing said additionally heated particles with said further heated particles of said third zone, said heated particles of said second zone and said continuously centrally fed cold heavier synthetic particles;

still further heating said additionally heated particles in admixture in said first zone;

and conducting said still further heated synthetic particles away from the upper portion of said mixing container at a given temperature.

2. A method of continuously mixing and preparing synthetic resins as claimed in claim 1 characterized in that the mixing and preparing process in the overall temperature range from room temperature (about 20° C) to the final temperature is performed through a plurality of intercoupled mixing containers, in each of which for controlling a given, bounded section of the several thermal production stages and the relevant consistencies, the properties and the behaviour of the synthetic resin mixture the friction and shear forces, speeds of rotation, temperature controls are adjustable in accordance with the conditions of the material.

3. A method of continuously mixing and preparing synthetic resins as claimed in claim 1 characterized in that ready powder mixtures are thermally prepared for being further processed in worm presses, rollers and the like.

4. A method of continuously mixing and preparing synthetic resins as claimed in claim 1 characterized in that a hot, completely gelated synthetic material is produced for direct further processes in worm presses, rollers and the like.

5. A method of continuously mixing and preparing synthetic resins as claimed in claim 1 characterized in that in the last thermal states the prepared synthetic mass is cooled to a completely gelated agglomerate.

6. A method for continuously preparing powdery to granular thermoplastic synthetics with which the material under the influence of a fast rotating mixing tool is continuously circulated, heated, mixed and agglomerated in several successively switched, separated from each other relating to space, and substantially equal steps operating in different temperature ranges, introducing the raw material into the first step and conducting away the finished prepared material from the last step after its having passed through all steps, characterized in that the material is circulated in every step in at least two zones lying one on top of the other in a mutual mixing chamber in dependency of the temperature of the material and of the grain size, that the cold raw material is introduced into the center of the lowest zone and that the treated material in the peripheral range of the top zone is conducted away.

* * * * *